(12) United States Patent
Dai et al.

(10) Patent No.: US 10,476,826 B2
(45) Date of Patent: Nov. 12, 2019

(54) ELECTRONIC COMMUNICATION MANAGEMENT

(71) Applicant: INTERNATIONAL BUSINESS MACHINES CORPORATION, Armonk, NY (US)

(72) Inventors: Liang Liang Dai, Beijing (CN); Li Gu, Beijing (CN); Jing Bo Jiang, Beijing (CN); Li Jiang, Beijing (CN); Yang Liu, Beijing (CN); Xue Ying Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 14/924,258

(22) Filed: Oct. 27, 2015

(65) Prior Publication Data

US 2017/0118080 A1 Apr. 27, 2017

(51) Int. Cl.
*H04L 12/58* (2006.01)

(52) U.S. Cl.
CPC .............. *H04L 51/16* (2013.01); *H04L 51/04* (2013.01)

(58) Field of Classification Search
CPC ........ G06Q 10/06; G06Q 10/10; G06Q 50/26; G06Q 40/00; G06Q 50/08; G06Q 50/18; G06Q 50/184; G06Q 10/063; G06Q 10/0639; G06Q 10/103; G06Q 30/0207; G06Q 30/0279; G06Q 30/04; G06Q 50/20; G06Q 10/0637; G06Q 10/06398; G06Q 50/02; G06Q 10/063116; G06Q 10/06312; G06Q 10/06314; G06Q 10/06315; G06Q 10/06395; G06Q 10/1097; G06Q 50/24; G06Q 10/0631; G06Q 10/063114; H04L 63/10; H04L 51/22; H04L 63/08; H04L 51/08; H04L 67/306; H04L 51/36; H04L 67/1097; H04L 51/046; H04L 51/16; H04L 63/108; H04L 12/1822; H04L 12/6418; H04L 65/4015; H04L 67/1095; H04L 41/0893; H04L 51/04; G06F 15/00; G06F 15/16; G06F 16/188; G06F 16/2282;
(Continued)

(56) References Cited

U.S. PATENT DOCUMENTS

2002/0076025 A1* 6/2002 Liversidge ............. G06Q 10/10
379/202.01
2009/0125600 A1 5/2009 Fitzpatrick et al.
(Continued)

OTHER PUBLICATIONS

Creating Relationships Between Contacts in Skylight Online CRM Tool, available online at http://support.skylight.com/contact-simple-crm/creating-relationships-between-contacts-in-skylight-online-crm-tool/, 6 pages, dated Jul. 20, 2015.
(Continued)

*Primary Examiner* — Djenane M Bayard
(74) *Attorney, Agent, or Firm* — Isaac J. Gooshaw, Esq.; George S. Blasiak, Esq.; Heslin Rothenberg Farley & Mesiti PC

(57) ABSTRACT

Methods, systems, and computer program products for enhancing a plurality of electronic communication systems for a plurality of users include, for example, providing data regarding at least one project, and linking the data regarding the at least one project with the plurality of electronic communication systems regarding the plurality of electronic communications for the plurality of users.

20 Claims, 11 Drawing Sheets

(58) Field of Classification Search
CPC ............. G06F 16/2445; G06F 16/2471; G06F 16/248; G06F 16/252; G06F 16/256; G06F 16/51; G06F 17/211; G06F 3/12; G06F 3/14; G06F 8/71
See application file for complete search history.

(56) References Cited

U.S. PATENT DOCUMENTS

| | | |
|---|---|---|
| 2009/0157570 A1 | 6/2009 | Pall et al. |
| 2009/0160876 A1 | 6/2009 | King et al. |
| 2010/0042600 A1 | 2/2010 | Orr et al. |
| 2011/0035323 A1* | 2/2011 | Hamilton ............... G06Q 10/06 705/301 |
| 2012/0233312 A1* | 9/2012 | Ramakumar ........ G06Q 10/101 709/224 |
| 2013/0326468 A1* | 12/2013 | Li .......................... G06Q 10/10 717/101 |
| 2015/0371168 A1* | 12/2015 | Karabin ........... G06Q 10/06313 705/7.23 |
| 2015/0379455 A1* | 12/2015 | Munzer .......... G06Q 10/063114 705/7.15 |

OTHER PUBLICATIONS

Tencent Enterprise QQ, available online at http://b.qq.com/eim/1.html?source=bqqV5&name=eim.main.caseOne.more, 4-pages, at least as early as Mar. 23, 2015.

\* cited by examiner

ELECTRONIC COMMUNICATION MANAGEMENT

TECHNICAL FIELD

The present disclosure relates generally to electronic communication, and more particularly, to methods, computer program products, and systems for electronic communication management.

BACKGROUND

Email and instant messaging tools are commonly used in business communications. Conventional email and instant messaging systems provide a view of the communications by date, individual user name, user group etc. Each systems may allow a user may manually create folders/tags for categorizing electronic communications.

SUMMARY

Shortcomings of the prior art are overcome and additional advantages are provided through the provision, in one embodiment, of a method for enhancing a plurality of electronic communication systems for a plurality of users. The method includes, for example, providing, by one or more processor, data regarding at least one project, and linking, by the one or more processor, the data regarding the at least one project with the plurality of electronic communication systems regarding the plurality of electronic communications for the plurality of users.

In another embodiment, a computer program product is provided. The computer program product includes: a computer readable storage medium readable by one or more processing unit and storing instructions for execution by the one or more processing unit for performing a method for enhancing a plurality of electronic communication systems for a plurality of users which includes, for example, providing data regarding at least one project, and linking the data regarding the at least one project with the plurality of electronic communication systems regarding the plurality of electronic communications for the plurality of users.

In a further embodiment, a system is provided. The system includes: a memory; and one or more processor in communication with the memory, where the system is configured to perform a method for enhancing a plurality of electronic communication systems for a plurality of users which includes, for example, providing data regarding at least one project, and linking the data regarding the at least one project with the plurality of electronic communication systems regarding the plurality of electronic communications for the plurality of users.

Additional features and advantages are realized through the techniques set forth herein. Other embodiments are described in detail herein and are considered a part of the claimed invention.

BRIEF DESCRIPTION OF THE DRAWINGS

One or more embodiments of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 10-14 illustrate display screen views in connection with an instant messaging system in accordance with one or more embodiments of the present invention.

DETAILED DESCRIPTION

Figure 1:
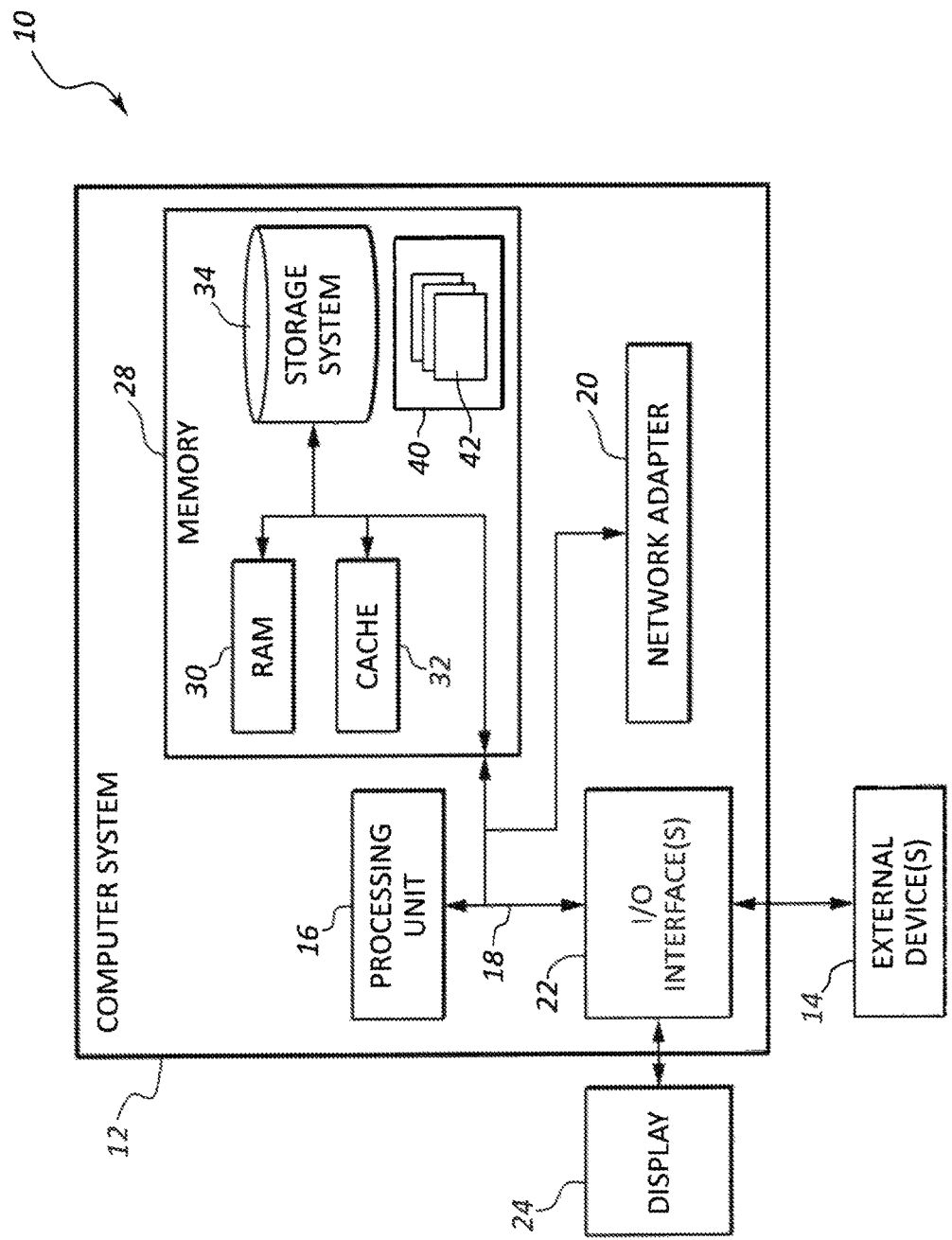
FIG. 1 depicts a cloud computing node according to an embodiment of the present invention.

Embodiments of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating embodiments of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure is directed generally to electronic communication management with various technical advantages including, for example, enhancing a plurality of electronic communication systems for a plurality of users. For example, the electronic communication management may be operable to set up data, which data is linked to a plurality of electronic communication systems regarding a plurality of electronic communications for a plurality of users. The data may be organizational data such as based on one or more project documents such as one or more project charters containing project roles and responsibility, contact information of the project members, contact information for stakeholders, etc. For example, the present technique may provide a centralized management of project data for a plurality of different electronic mail systems, a plurality of different instant messaging systems, other electronic communication systems, and combinations thereof. In other embodiments, updated project data may be synchronized in real-time with the plurality of electronic communication systems regarding the plurality of electronic communications for a plurality of users. Implementing the technique of the present invention may enhance the performance of electronic communication systems, thereby increasing the efficiency of the electronic communication systems as a whole for use by users.

FIGS. 1-4 depict various embodiments of computing, including cloud computing, in accordance with one or more embodiments set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
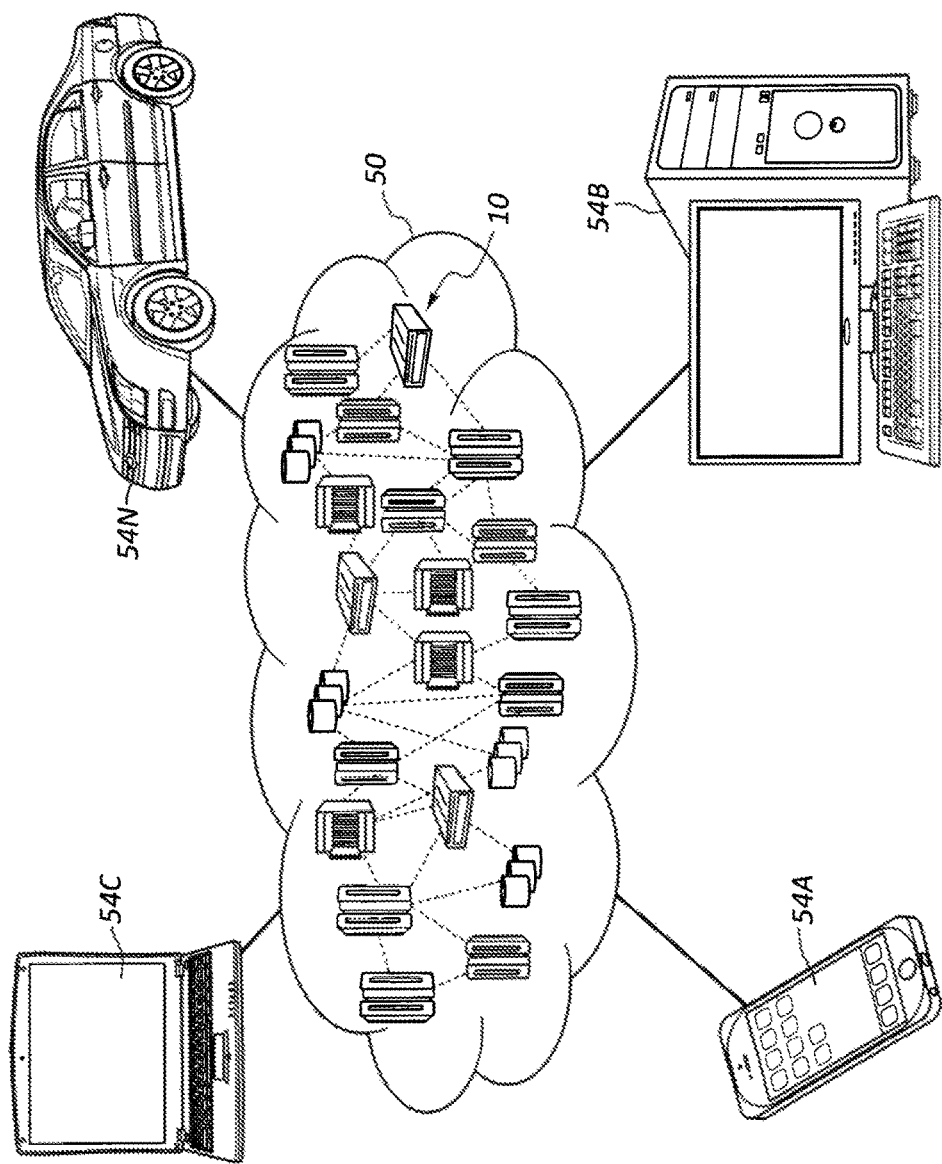
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
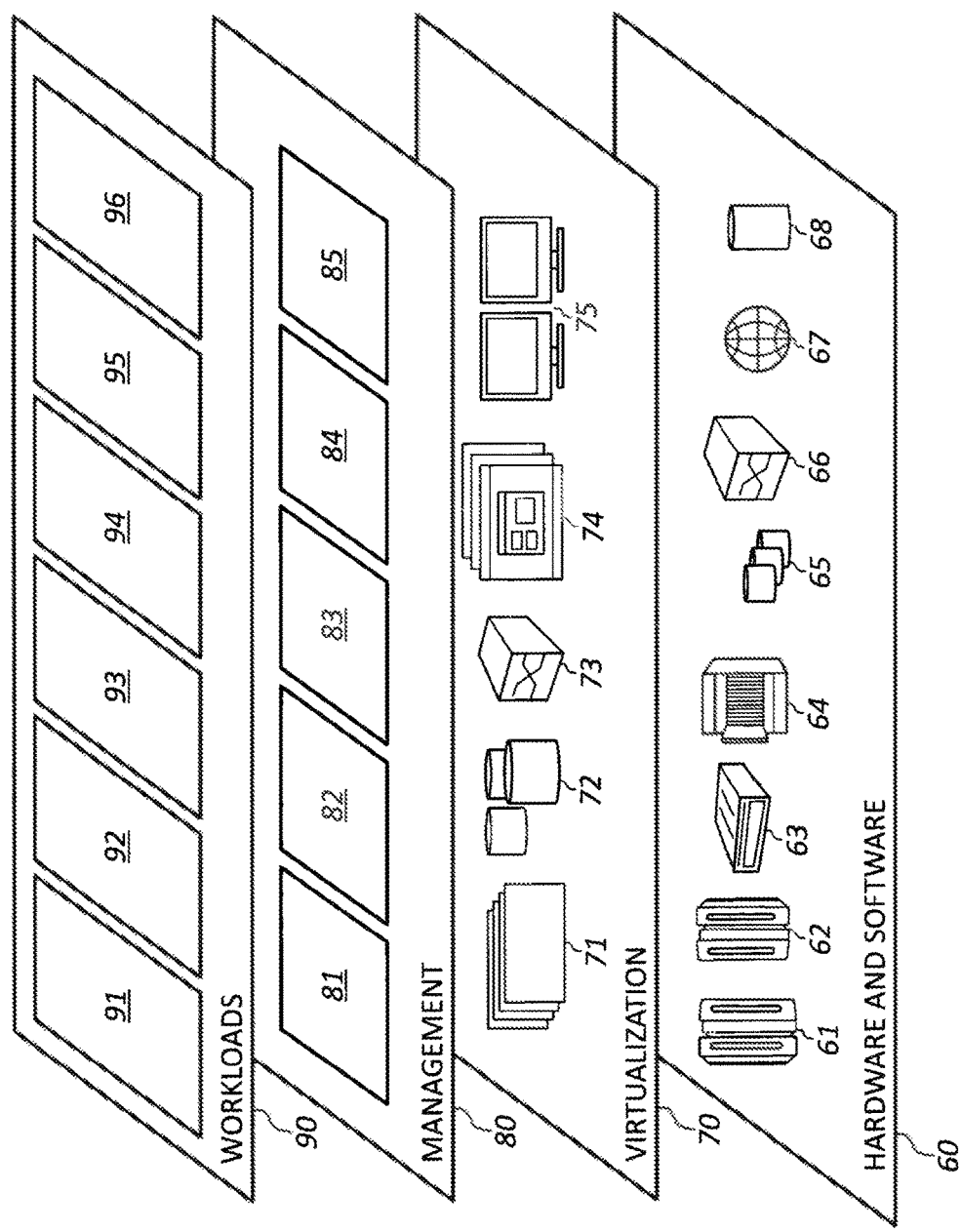
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and electronic communication management 96 as described herein.

Figure 4:
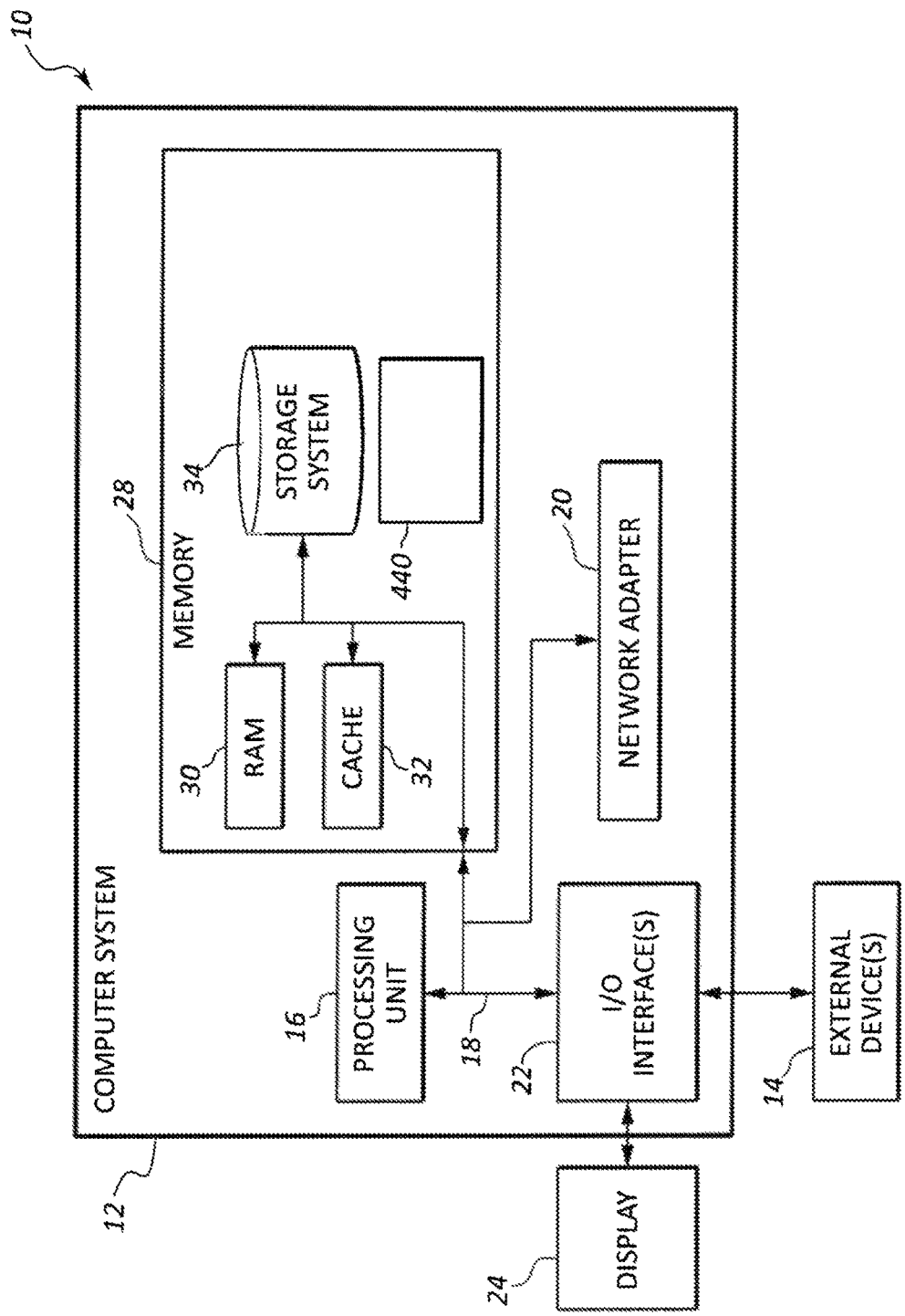
FIG. 4 depicts a hardware overview of a computing node, which may be a cloud computing node, in accordance with one or more embodiments set forth herein.

FIG. 4 depicts a hardware overview of a computing node 10, which may be a cloud computing node, in accordance with one or more embodiments set forth herein. The computing node as set forth in FIG. 4 can include the hardware components as set forth in reference to computing node 10 as set forth in reference to FIG. 1. By way of example, computing node 10 may generally be any of the computing devices described herein, such as network devices, client computers, server computers, etc.

Program/utility 40 as set forth in FIG. 1 can provide the functionality of electronic communication management 96 as set forth in FIG. 3. Program/utility 40 as set forth in FIG. 1 can include one or more program 440 as set forth in FIG. 4.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein, such as electronic communication management 96 (FIG. 3).

Referring again to FIG. 4:

The present invention may be a system, a method, and/or a computer program product. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiment of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
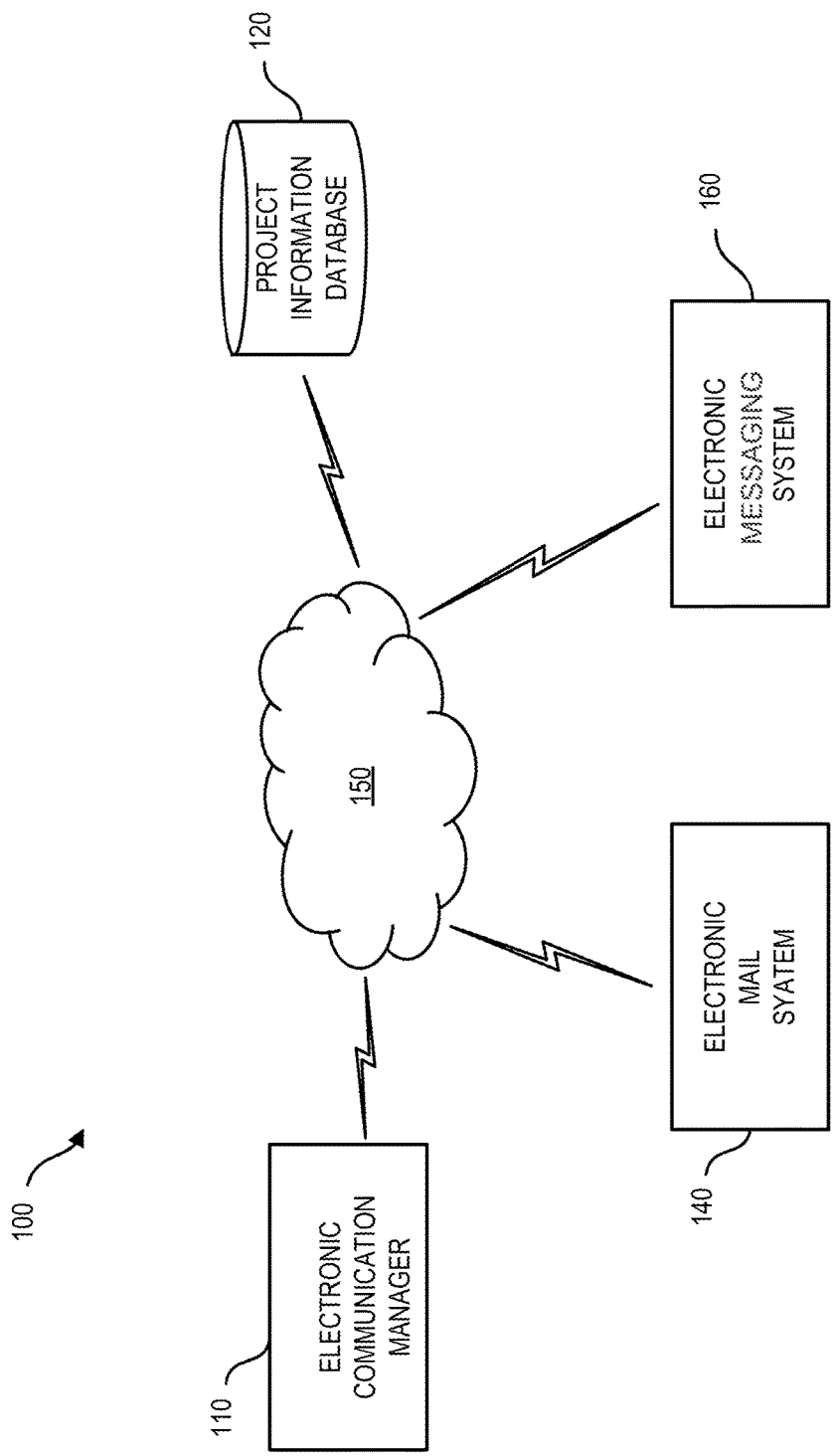
FIG. 5 is an exemplary block diagram of a system, in accordance with one or more embodiments set forth herein.

FIG. 5 is an exemplary block diagram of a system 100, in accordance with one or more embodiments set forth herein. In the embodiment of FIG. 5, system 100 includes numerous devices, which may be or include computing nodes 10 as previously described, connected by a network 150. For example, network 150 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which system 100 for electronic communication management may include one or more electronic communication manager 110 and one or more project information database 120, which may be in communication with one or more electronic communication systems such as one or more electronic mail system 140, one or more instant messaging system 160, one or more other electronic communication system, and combinations thereof. The electronic communication manager 110 shown as being in communication via network 150 can alternatively be co-located at project information database 120. In other embodiments, electronic communication manager 110 and/or project information database 120 may be incorporated into one or more electronic communication system such as implemented as an enhancement in a contacts management module of email message systems and/or instant messaging systems.

Figure 6:
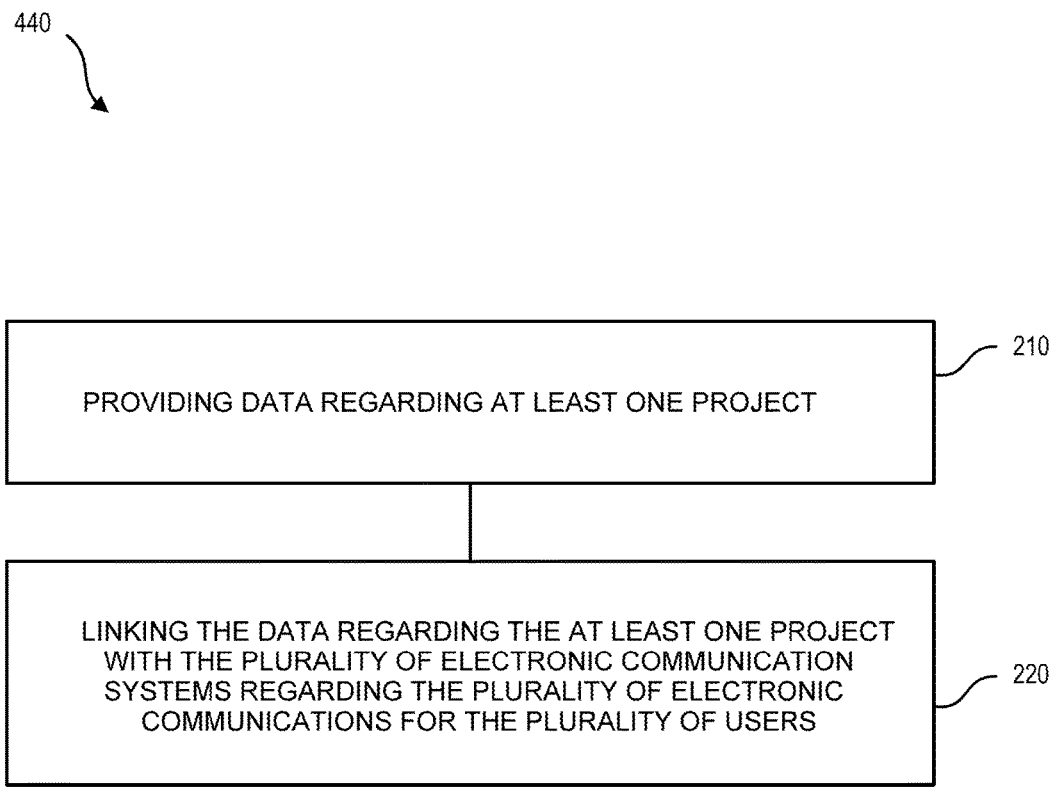
FIG. 6 illustrates a process in accordance with embodiments of the present disclosure.

FIG. 6 illustrates a process for use in electronic communication management for enhancing a plurality of electronic communication systems for a plurality of users in accordance with embodiments of the present disclosure. By way of example, the processes described with respect to FIG. 6 can be performed using one or more program 440 (FIG. 4) on one or more project based electronic communication manager 110 (FIG. 5), as detailed with respect to FIG. 4.

For example, one or more program 440 may include at 210, providing data regarding at least one project, and at 220 linking the data regarding the at least one project with a plurality of electronic communication systems regarding a plurality of electronic communications for a plurality of users.

Figure 7:
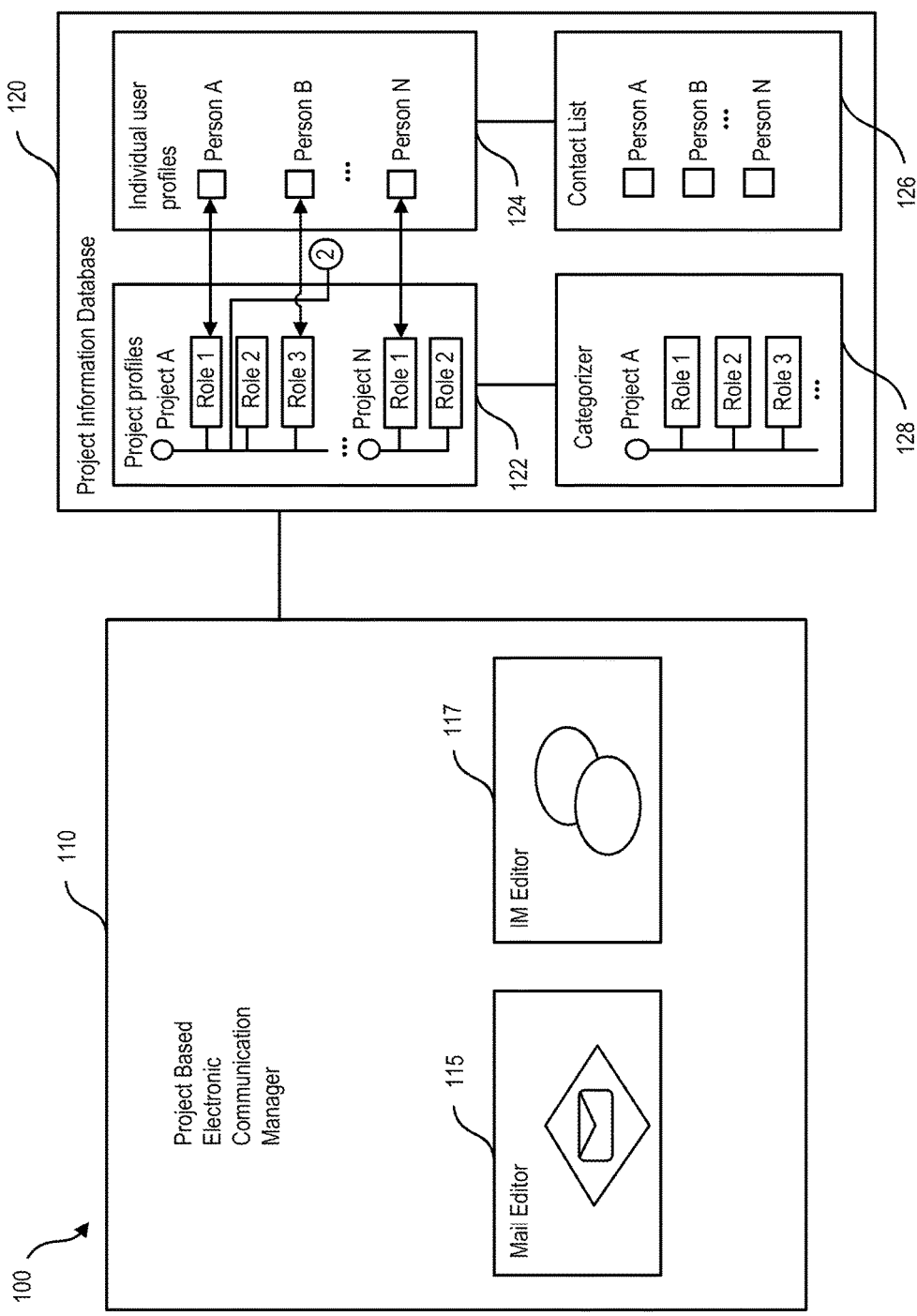
FIG. 7 is a block diagram of a system in accordance with one or more embodiments set forth herein.

FIG. 7 is a block diagram of an embodiment of system 100 for use in electronic communication management in accordance with one or more embodiments set forth herein. In this example, system 100 may be employed in combination with a plurality of different electronic communication systems (e.g., one or more electronic mail system 140 and one or more instant messaging systems 160 as shown in FIG. 5).

As shown in FIG. 7, in one embodiment, system 100 may include electronic communication manager 110 (which may correspond to project based electronic communication manager 110 in FIG. 5). Electronic communication manager 110 may generally manage one or more organization or project hierarchy and associated linkage between project roles, personnel, and contacts used in the system which may be stored in project information database 120 (e.g., which may correspond to project information database 120 in FIG. 5).

Information regarding the project may be managed via electronic communication manager 110 employing text based or graphical user interface (GUI) tools for input by a user based on project charters, project definitions, or project statements. In another embodiment, information regarding the project may be imported or uploaded directly from project charters, project definitions, or project statements. For example, project charters, project definitions, or project statements may generally define a statement of the scope, objectives, and participants in a project along with delineations of roles, contacts, and responsibilities, outlines of the project objectives, identification of the main stakeholders (e.g., such as creditors, directors, government (and its agencies), owners (shareholders), suppliers, unions, and the community from which the business draws its resources, etc.), and defines the authority of the project manager.

Project information database 120 may include a project profile 122, an individual user profile 124, a contact list 126, and a categorizer 128. Project profile 122 may identify a plurality of different projects, such as ProjectA to ProjectN, each having a plurality of roles. The project profiles may include current profiles as well as project profiles indicating historical changes over time. Project information database 120 may include individual user profiles 124 of the personnel corresponding to the plurality of roles. The user profiles of the personnel corresponding to the plurality of roles may include current user profiles as well as user profiles indicating historical changes over time. Contact list 126 may include contact information such as electronic addresses for personnel for effecting electronic communication such as email messages and instant messaging. Contact list 126 may be updated in response to changes in a project charter managed by project manager 110. Electronic communication categorizer 128 may be employed to categorize electronic communications based on project information. For example, electronic communication categorizer 128 may set up folders or tags for projects and sub teams that are associated with or linkable to specific electronic communications.

Electronic communication manager 110 may be linked with, e.g., a plurality of electronic communication editors such as an electronic mail editor 115 and an instant messaging editor 117, a plurality of electronic communication programs or systems such as electronic mail system 140 (FIG. 5) and instant messaging system 160 (FIG. 5).

With reference still to FIG. 7, embodiments of the present disclosure may be implemented as follows. Project information or data such as a project charter data may be managed by project based electronic manager 110, then uploaded to project information database 120. In project information database 120, the associations or linkages between the roles in each project and individuals may then established or maintained. Similarly, the project information data may be implemented for stakeholders. For example, project profiles may include stakeholders, which stakeholders are associated or linked to individual user profiles, corresponding contacts and categorized history.

With regard to instant messaging, for example, in response to a chat window being opened by a user in an instant messaging program or system, the instant messaging system may communicate with instant messaging editor 117 and obtain current project metadata and role information (e.g., from project profile 122 and project personnel 124), current associated contact identification (e.g., from contact list 126), and chat history (e.g., from categorizer 128). After receiving this information, instant messaging system may display role information in a chat window, as well as chat history for the role in the current project, for the user.

With regard to email messages, in response to a user sending or viewing email messages, an email program or system may communicate with email editor 115 and obtain project role information (e.g., from project profile 122 and project personnel 124), current associated contact identification (e.g., from contact list 126), and email history (e.g., from categorizer 128) based on the email message created or received. The retrieved information or data may then be displayed in the user's email message.

In addition to email or instant message programs or systems retrieving contact lists, the project information data regarding the project profile may also be retrieved for the contacts. Then based on project identification and role, the contact list can provide project hierarchy for display and viewing used by end users. In response to an email message arriving at a server, mail categorizer 128 may be triggered. Mail categorizer 128 will firstly obtain project information of the sender and the receiver. Since most senders/receivers will belong to a certain project, the email message will be categorized to or be related to that project. A configurable threshold can be utilized for this categorization. For example, if the ratio of the count of senders/receivers belonging to ProjectA to the total sender/receiver count is greater than a threshold, then the email is marked as related to ProjectA.

In another embodiment, email or instant message programs or systems may be sent via instant messaging editor 117 and via email editor 115 data contained in project information data base (e.g., mirror database) periodically, or automatically in response to updating of the project information database. Then, the email or instant message programs or systems may employ the project information data in connection with instant chat and email as noted above.

Figure 8:
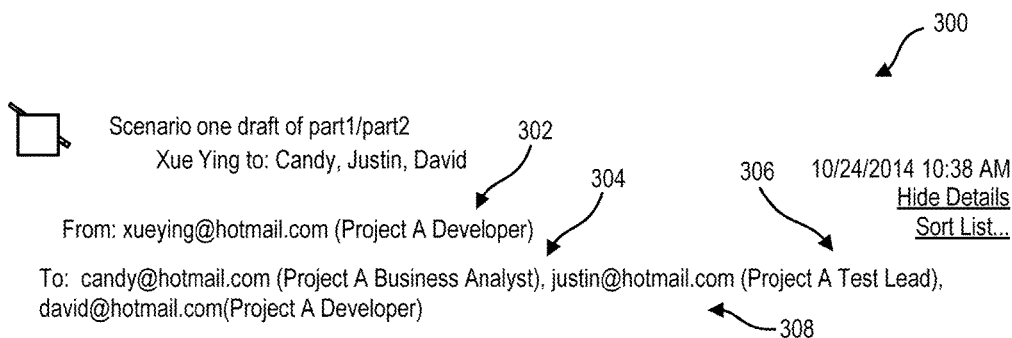
FIGS. 8 and 9 illustrate display screen views in connection with an electronic mail system in accordance with one or more embodiments of the present invention.
Figure 9:
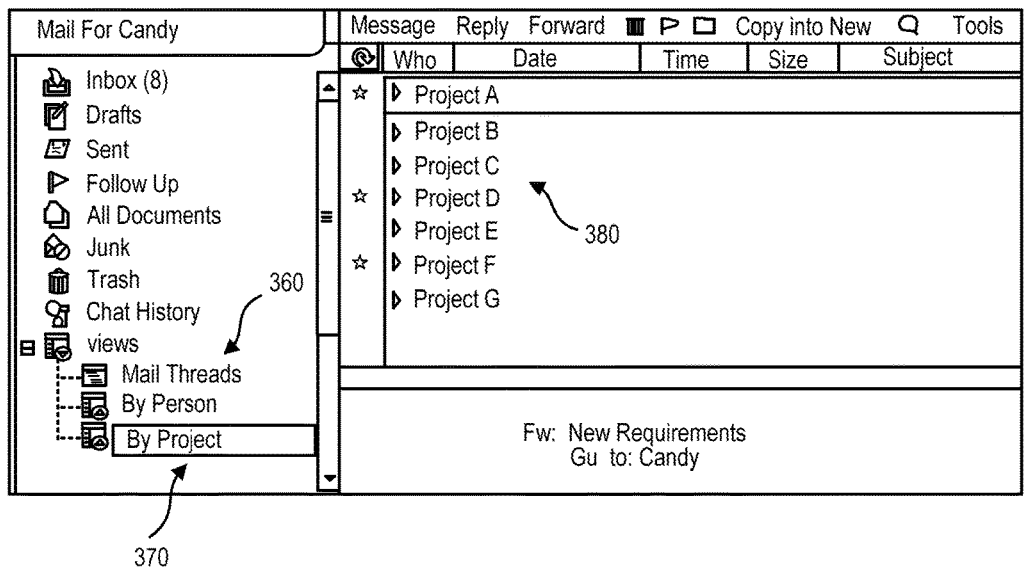

With reference now to FIG. 8, in response to a user receiving an email message 300, the user is able to see the project role information 302, 304, 306, and 308 of each individual listed in the "To:" and "From" fields. As shown in FIG. 9, a portion of a displayed inbox of a home page 350 of an electronic message system may include views 360 which may include "By Project" 370 for viewing a list 380 of projects. For example, in response to a new email message arriving, by default, the system may determine which project the electronic communication belongs to, and then take action to categorize it accordingly.

Figure 10:
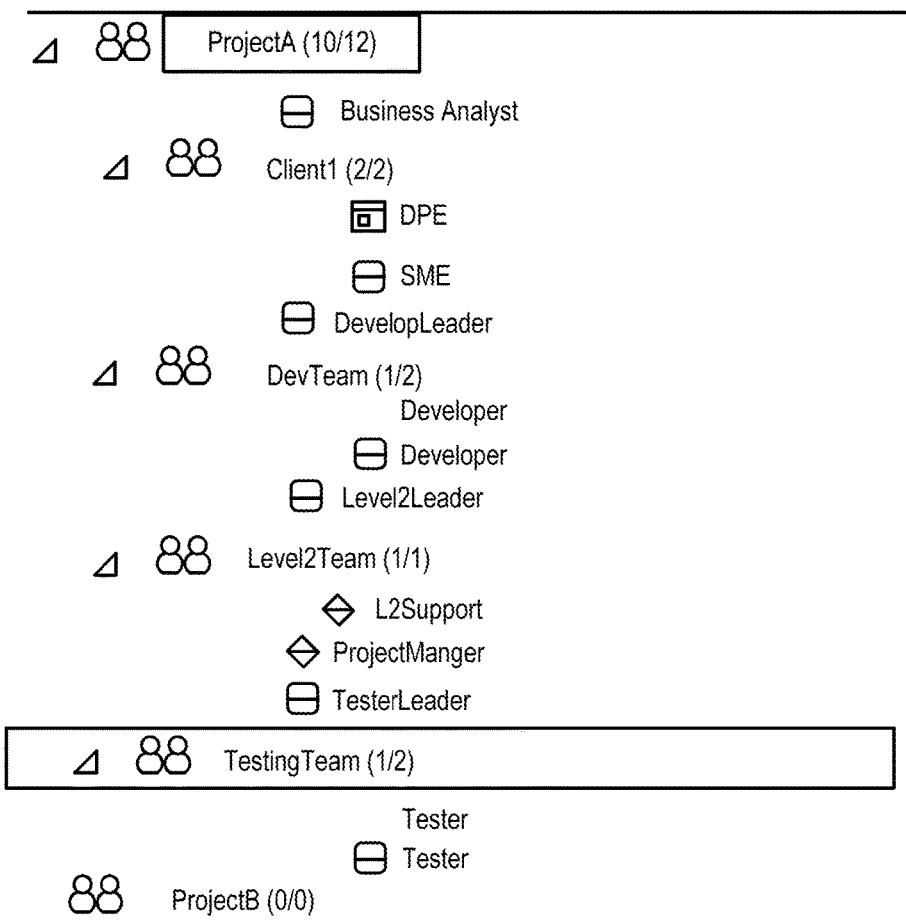
Figure 11:
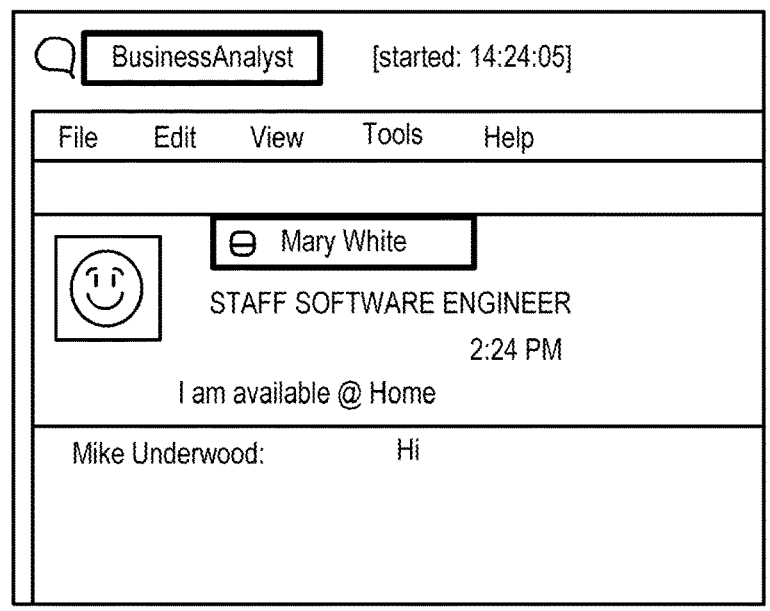
Figure 12:
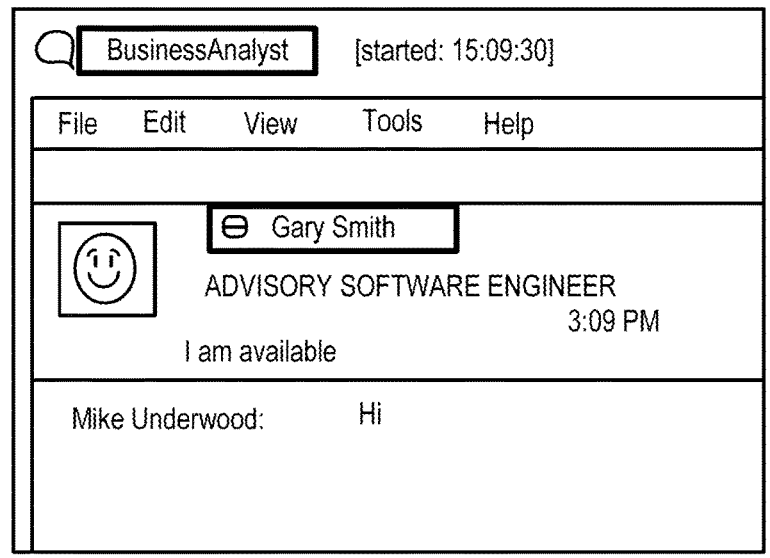

FIG. 10 illustrates a contact list 400 of an instant messaging system when a project document, e.g. for ProjectA, is employed or imported to a contact list. The members of this project may be listed and shown as their project roles, so that an end user need not know which individual each role is linked to until he/she opens a chat window 410 as shown in FIG. 11. At one point in time, opening a chat window with a "Business Analyst" for ProjectA may list "Mary White", a staff software engineer. At a later time and based on project information updates, should a member leave the project, the system provides for updating the member with a new member. For example, a change in the Business Analyst of ProjectA at a later time will result upon opening a chat window 420, as shown in FIG. 12, with the "Business Analyst" for ProjectA now listing the new member "Gary Smith" an advisory software engineer.

Figures 13, 14:
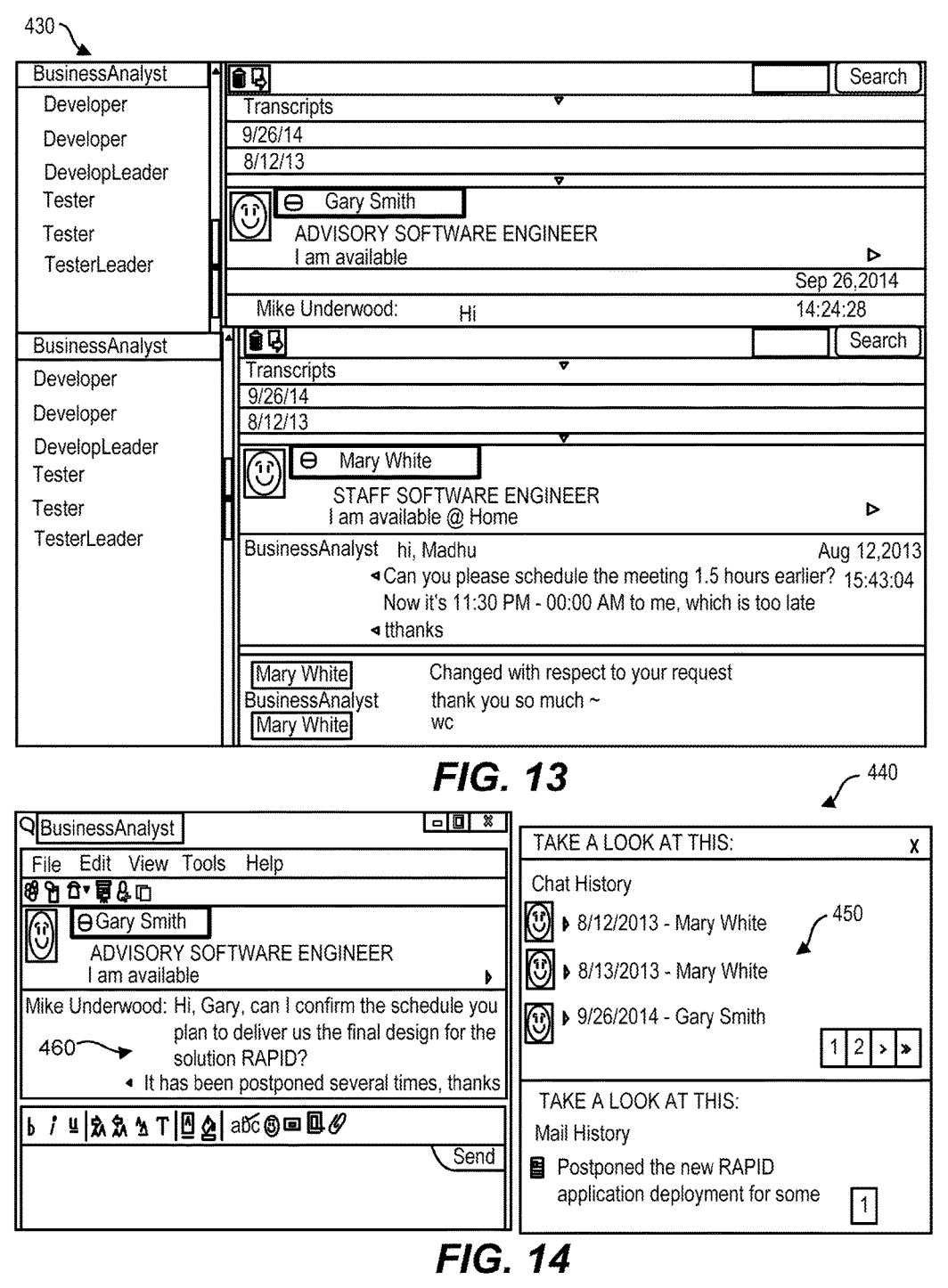

Because communication history is stored and categorized based on the project roles, as described above, instead of individuals, a user may easy obtain all the previous chat or emails between him/her and the "role", for example, ProjectA Business Analysts, for display in a communication history 430 as shown in FIG. 13, and which may be used by the user as a reference to track issues. In addition, the related content in the communication history can also be obtained or fetched on-demand based on, for example, a keyword search, when an end user is trying to follow up some previous topic with the individual for some role. FIG. 14 illustrates a screen display 440 listing search results or chat history 450, and allowing review of a selected listed chat 460 by the user.

During an ongoing electronic communication, the system may provide, such as an instant messaging chat, access to a listing and retrieval of prior electronic communications. For example, during real-time communication, a reference list of prior electronic communications may pop up or be selectable for display, wherein a user may choose to view the prior electronic communications (such as both emails and instant messaging) related to the participants, the topic of the current ongoing electronic communication, based on search terms or key words entered by the user during the current ongoing electronic communication, etc.

From the present description, it will be appreciated that the present technique may allow participants to communicate with other members having different roles on different projects even when working on many different projects in parallel. The present disclosure may allow for maintaining and categorizing role based project communication information for real-time reference including different electronic communications such as email and instant messaging threads and historical information. The present disclosure may provide a centralized management of project related information for electronic mail and instant messaging systems, whereby users need not separately set up management of electronic communication based on projects in multiple electronic communication systems. The present disclosure may manage and provide a visualization to electronic communications at a project level, and may include access to communication history both for email messaging and instant messaging. The present technique may improve existing electronic email systems, instant messaging systems, and other electronic communication systems, without impacting current usage of such systems.

As will also be appreciated from the description above, providing a centralized management of electronic communication systems based on project data such as a project hierarchy or tree may aid in electronic communications across a plurality of users. Such a system may provide electronic communications in connection with one or more projects with identification of correct and current roles of personnel or stakeholders in the one or more projects. As noted above, in response to a user sending an email message, one can select the designated personnel or stakeholder based on a project role or roles through a project hierarchy instead of selecting specific individual, individuals, or groups from one's own contact list. In response to a user viewing an email message or an instant message chat with project members, one may not only see the name of the person or mail address, but also the project and/or person's project role. If a person assigned to the role changes over time, project role information may be updated automatically to reflect current roles and assigned personnel or stakeholder. The system may categorize a plurality of electronic communications based on project data. For example, in response to a user receiving an email message or finishing a chat session with a member, the system may automatically determine which project the electronic communication belongs to, then take action to assign and/or historically categorize the electronic communication accordingly. It will be appreciated that the historical categorization may also be customized by users as well.

The technique of the present disclosure may result in a dynamic collection and real time organization or mapping of project structure information to allow for real-time electronic communication enhancement. The ability of synchronizing in real-time updated project information data with different tools may provide enhanced communication mechanisms, contact list management with up-to-date project information, and email and instant messaging enhancement by showing role of sender/receivers, group by project roles etc.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the present disclosure and the practical application, and to enable others of ordinary skill in the art to understand the present disclosure as described herein for various embodiments with various modifications as are suited to the particular use contemplated.

What is claimed is:

1. A method comprising:
   providing, by one or more processor, data regarding at least one project; and
   linking, by the one or more processor, the data regarding the at least one project with a plurality of electronic communication systems, the plurality of electronic communication systems supporting electronic communications for a plurality of users, wherein the providing data regarding at least one project includes providing project data regarding a plurality of different projects, wherein the different projects each comprise project roles, project members, and electronic contact information for the project members, and the linking comprises linking the project roles, project members, and electronic contact information for the project members regarding the at least one project with the plurality of electronic communication systems regarding the plurality of electronic communications for the plurality of users, wherein the plurality of electronic communication systems comprises at least one email message system and at least one instant message system and wherein the method includes in response to an email message being sent and received at a server, categorizing the email message as belonging to a certain one of the plurality of different projects based on an examining of the project data regarding a plurality of different projects and individuals listed in To and From fields, and based on the categorizing marking the email message so that names specified in the email message are displayed with adjacent text that specifies roles associated to the names.

2. The method of claim 1 wherein the data regarding at least one project comprises organizational data regarding the at least one project.

3. The method of claim 1 wherein the linking comprises synchronizing in real time updated data regarding the at least one project with the plurality of electronic communication systems regarding the plurality of electronic communications for the plurality of users upon updating of the data.

4. The method of claim 1 wherein the plurality of electronic communication systems comprises a plurality of different electronic communication systems.

5. The method of claim 1 wherein the data regarding the at least one project is based on at least one project document.

6. The method of claim 1 wherein the providing comprises providing the data comprising project roles, and the linking comprises linking the project roles regarding the at least one project with the plurality of electronic communication systems regarding the plurality of electronic communications for the plurality of users.

7. The method of claim 1 wherein the providing comprises providing the data comprising project stakeholders and electronic contact information for the project stakeholders, and the linking comprises linking the project stakeholders regarding the at least one project with the plurality of electronic communication systems regarding the plurality of electronic communications for the plurality of users.

8. The method of claim 1 wherein the providing comprises providing data comprising electronic communication history, and the linking comprise linking the electronic communication history regarding the at least one project with a plurality of electronic communication systems regarding the plurality of electronic communications for the plurality of users.

9. The method of claim 1 wherein the data regarding at least one project comprises organizational data regarding the at least one project, wherein the providing comprises updating the data regarding the at least one project to provide updated data, wherein the linking comprises synchronizing in real time the updated data regarding the at least one project with the plurality of electronic communication systems regarding the plurality of electronic communications for the plurality of users upon updating of the data, wherein the plurality of electronic communication systems comprises at least one email message system and at least one instant message system, wherein the data regarding the at least one project comprises data regarding a plurality of projects, and the linking comprises linking the data regarding the plurality of projects with at least one electronic communication system regarding the plurality of electronic communications for the plurality of users, wherein the data regarding the at least one project is based on at least one project document, wherein the providing comprises providing the data comprising project roles, project members, and electronic contact information for the project members, wherein the providing comprises providing the data arranged in a hierarchical structure, and the linking comprises linking the data arranged in a hierarchical structure regarding the at least one project with the plurality of electronic communication systems regarding the plurality of electronic communications for the plurality of users, and wherein the providing comprises providing data comprising electronic communication history, and the linking comprise linking the electronic communication history regarding the at least one project with a plurality of electronic communication systems regarding the plurality of electronic communications for the plurality of users.

10. The method of claim 1 wherein the providing data regarding at least one project includes providing project data comprising project roles, project members, and electronic contact information for the project members, and wherein the plurality of electronic communication systems comprises at least one email message system and at least one instant message system.

11. The method of claim 1 wherein the providing data regarding at least one project includes providing project data comprising project roles, project members, and electronic contact information for the project members, wherein the plurality of electronic communication systems comprises at least one email message system and at least one instant message system and wherein the method includes in response to an email message being sent accessing a project role of the sender of the email message from the project data and displaying text specifying the project role of the sender in the email message.

12. The method of claim 1 wherein the providing data regarding at least one project includes providing project data comprising project roles, project members, and electronic contact information for the project members, wherein the plurality of electronic communication systems comprises at least one email message system and at least one instant message system, and wherein the method includes displaying an electronic communication using the project data to display a name of a first individual with adjacent text that specifies a role associated to the name of the first individual, and in response to an input by a user viewing the displayed electronic communication, displaying past electronic communications of a second individual, the second individual previously occupying the role associated to the name of the first individual.

13. The method of claim 1 wherein the providing comprises providing project data comprising project roles, project members, and electronic contact information for the project members, wherein the method includes in response to an electronic communication being sent accessing a project role of a recipient of the electronic communication from the project data so that the electronic communication when displayed on a device of the recipient displays adjacent text adjacent to a name specifying the recipient, the adjacent text specifying a role of the project member.

14. A computer program product comprising:
a computer readable storage medium readable by one or more processing unit and storing instructions for execution by the one or more processing unit for performing the method comprising:
providing data regarding at least one project; and
linking the data regarding the at least one project with a plurality of electronic communication systems, the plurality of electronic communication systems supporting electronic communications for a plurality of users, wherein the providing data regarding at least one project includes providing project data regarding a plurality of different projects, wherein the different projects each comprising project roles, project members, and electronic contact information for the project members, and the linking comprises linking the project roles, project members, and electronic contact information for the project members regarding the at least one project with the plurality of electronic communication systems regarding the plurality of electronic communications for the plurality of users, wherein the plurality of electronic communication systems comprises at least one email message system and at least one instant message system and wherein the method includes in response to an email message being sent and received at a server, categorizing the email message as belonging to a certain one of the plurality of different projects based on an examining of the project data regarding a plurality of different projects and individuals listed in To and From fields, and based on the categorizing marking the email message so that names specified in the email message are displayed with adjacent text that specifies roles associated to the names are displayed with adjacent text that specifies roles associated to the names.

15. The computer program product of claim 14 wherein the data regarding at least one project comprises organizational data regarding the at least one project.

16. The computer program product of claim 14 wherein the linking comprises synchronizing in real time updated data regarding the at least one project with the plurality of electronic communication systems regarding the plurality of electronic communications for the plurality of users upon updating of the data.

17. The computer program product of claim 14 wherein the plurality of electronic communication systems comprises a plurality of different electronic communication systems.

18. The computer program product of claim 14 wherein the data regarding the at least one project is based on at least one project document.

19. The computer program product of claim 14 wherein the providing comprises providing the data comprising project roles, and the linking comprises linking the project roles regarding the at least one project with the plurality of electronic communication systems regarding the plurality of electronic communications for the plurality of users.

20. A system comprising:
a memory;
one or more processor in communication with the memory; and
program instructions executable by the one or more processor via the memory to perform a method for enhancing a plurality of electronic communication systems for a plurality of users, the method comprising:
providing data regarding at least one project; and
linking the data regarding the at least one project with the plurality of electronic communication systems, the plurality of electronic communication systems supporting electronic communications for the plurality of users, wherein the providing data regarding at least one project includes providing project data regarding a plurality of different projects, wherein the different projects each comprising project roles, project members, and electronic contact information for the project members, and the linking comprises linking the project roles, project members, and electronic contact information for the project members regarding the at least one project with the plurality of electronic communication systems regarding the plurality of electronic communications for the plurality of users, wherein the plurality of electronic communication systems comprises at least one email message system and at least one instant message system and wherein the method includes in response to an email message being sent and received at a server, categorizing the email message as belonging to a certain one of the plurality of different projects based on an examining of the project data regarding a plurality of different projects and individuals listed in To and From fields, and based on the categorizing marking the email message so that names specified in the email message are displayed with adjacent text that specifies roles associated to the names.

* * * * *